United States Patent [19]

De Craene et al.

[11] Patent Number: 5,804,663
[45] Date of Patent: Sep. 8, 1998

[54] RADIATION SENSITIVE VINYL AROMATIC BLOCK COPOLYMERS AND COMPOSITIONS CONTAINING THEM

[75] Inventors: Luc Ives Jaak De Craene, Amsterdam, Netherlands; Martine Jeanne Dupont, Louvain-La-Neuve, Belgium; Noel Raymond Maurice De Keyzer, Louvain-La-Neuve, Belgium; Karin Marie-Louise Renee Morren, Louvain-La-Neuve, Belgium; Jeroen Van Westrenen, Amsterdam, Netherlands

[73] Assignee: Shell Oil Company, Houston, Tex.

[21] Appl. No.: 614,564

[22] Filed: Mar. 13, 1996

[30] Foreign Application Priority Data

Mar. 16, 1995 [EP] European Pat. Off. ........... 95301764.7

[51] Int. Cl.$^6$ .......................... C08L 53/02; C08F 297/04
[52] U.S. Cl. ............................. 525/314; 525/105; 525/89
[58] Field of Search .................................. 525/314, 105, 525/89

[56] References Cited

U.S. PATENT DOCUMENTS

| | | | |
|---|---|---|---|
| 3,917,607 | 11/1975 | Crossland et al. | 524/478 |
| 3,984,509 | 10/1976 | Hall et al. | 264/40.1 |
| 5,212,249 | 5/1993 | Richie et al. | 525/258 |
| 5,300,582 | 4/1994 | Debier et al. | 525/314 |
| 5,369,175 | 11/1994 | Hoxmeier et al. | 525/99 |
| 5,576,395 | 11/1996 | Spence et al. | 525/314 |

FOREIGN PATENT DOCUMENTS

93/24547  12/1993  WIPO.

*Primary Examiner*—Mark L. Warzel

[57] ABSTRACT

Radiation sensitive block copolymers to be used in hot melt adhesive composition characterized in that they have the general formula $(AB)_p(B^1)_qX$, wherein A is poly(vinylaromatic) block and B and $B^1$ are poly(butadiene) blocks, wherein X is the residue of a hexavalent coupling agent, wherein p and q both have a number average value in the range from 1.5 to 4.5, whereas the sum of p and q values being 6, wherein the block copolymers have an average bound vinyl aromatic content in the range of from 10 to 50 wt %, preferably in the range of from 10 to 30 wt %, a total apparent molecular weight in the range of from 100,000 to 500,000, and a vinyl content in the poly(butadiene) blocks in the range of from 35 to 70 wt %.

12 Claims, No Drawings

RADIATION SENSITIVE VINYL AROMATIC BLOCK COPOLYMERS AND COMPOSITIONS CONTAINING THEM

FIELD OF THE INVENTION

The invention relates to radiation sensitive vinyl aromatic block copolymers and to compositions containing them. More particularly, the invention relates to radiation sensitive block copolymers containing at least one block derived from a vinyl aromatic monomer and at least one block derived from butadiene and to radiation curable adhesive, sealant, or coating compositions containing them.

BACKGROUND OF THE INVENTION

Such block copolymers and radiation curable adhesive, sealant and coating compositions containing them, are known from e.g. the PCT application published as WO 93/24547 which disclosed block copolymers $(AB)_p(B)_qX$ wherein A was a poly(vinylaromatic) block and B was a poly(butadiene) block, wherein X was the residue of a tetravalent coupling agent such $SiCl_4$, $SnCl_4$, or DEAP or a polyvalent coupling agent like divinylbenzene giving a multiarmed radial block copolymers showing a great number of arms (6<n<20), said block copolymers having an average bound vinylaromatic content of from 7 to 35 wt % and having a total apparent molecular weight in the range of from 50,000 to 1,500,000 and wherein the vinyl content in the poly(butadiene) blocks was in the range of from 35 to 70 wt %. In this publication WO 93/24547, a clear preference was taught for four armed block copolymers having the average desired structure $(AB)_2(B)_2X$ wherein the B segments are of equal apparent molecular weight. Actually, the values of p and q had to be regarded as number average values due to the occurrence of a mixture of a series of individual molecules which were obtained by the coupling of simultaneously present living polymer arm components.

It will be appreciated that poly(butadiene) arms with a vinyl content (due to 1,2-polymerization of 1,3-butadiene) in the range of from 35 to 70 wt % was thought to be reached only in the presence of an ether compound during polymerization. The normally preferred alternative coupling processes, using polyvalent coupling agents with subsequent addition of the living, intermediate polymer arms, as was known from European Patent Application 0 314 256 and U.S. Pat. No. 5,212,249 were regarded not to be applicable to making polymers of the type herein.

It will be appreciated that in the case of simultaneous coupling of both types of living polymer arms with a hexavalent coupling agent, the individual block copolymer molecules in the mixture actually prepared will be $(AB)_6X$, $(AB)_5BX$, $(AB)_4B_2X$, $(AB)_3B_3X$, $(AB)_2B_4X$, $AB(B)_5X$ and $(B)_6X$ while the desired $(AB)_3(B)_3X$ occurs in an amount of 45%, when the ratio between the initially prepared living polymers AB-Li and BLi of about 1.0.

It will be appreciated that higher environmental and economical requirements have to be met by adhesive coating or sealant compositions which contain block copolymers of vinyl aromatic and conjugated diene. It would be advantageous if radiation curable adhesive compositions were further improved by minimizing the melt viscosity of hot melt compositions and the sensitivity to UV and EB radiation were increased to allow an increase in processing line speeds and production rates or using weaker radiation.

SUMMARY OF THE INVENTION

Accordingly, one aspect of the present invention provides specific radiation sensitive block copolymers $(AB)_p(B^1)qX$, wherein A is a poly(vinyl aromatic) block and B and $B^1$ are poly(butadiene) blocks, wherein X is the residue of hexavalent coupling agent, wherein p and q both have a number average value in the range of from 1.5 to 4.5 whereas the sum of p and g values is 6, wherein said block copolymers have an average bound vinyl aromatic content in the range of from 10 to 50 wt %, and preferably in the range of from 10 to 30%, and also have a total apparent molecular weight in the range of from 100,000 to 500,000 and a vinyl content in the polybutadiene blocks in the range of from 25 to 70 wt %, and preferably in the range of from 45 to 70%. Preferably p and q in the present radiation sensitive block copolymers have both a number average value of from 2.8 to 3.2 or p and q have values from 1.8 to 2.2 and 3.8 to 4.2, respectively.

The A blocks in said block copolymers have in general an apparent molecular weight in the range of from 5,000 to 50,000 preferably from 7,000 to 20,000, and most preferably from 9,000 to 15,000. The B and $B^1$ blocks in said block copolymers have an apparent molecular weight in the range of from 15,000 to 250,000 and preferably from 25,000 to 100,000. It will be appreciated that the respective B and $B^1$ blocks in a block copolymer may have the same or different molecular weight. The radiation sensitive block copolymers of the present invention preferably have a total apparent molecular weight in the range of from 200,000 to 350,000. The vinyl content in the poly(butadiene) arm blocks is preferably in the in the range of from 45 to 70%.

DETAILED DESCRIPTION OF THE INVENTION

The radiation sensitive block copolymers of the present invention are prepared by a process, which comprises:

(a) polymerizing a monovinyl aromatic monomer in the presence of an organolithium initiator RLi and preferably an alkyl lithium, having from 4 to 6 carbon atoms, to form a living polymer ALi;

(b) polymerizing butadiene to the living polymer ALi and on a previously predetermined moment to the organolithium initiator RLi giving a mixture of living polymers A-B-Li and $B^1$ Li wherein the segments B and $B^1$ may have the same or different molecular weights, while the molecular weights $M[B] \geq M[B^1]$ dependent on the exact moment of addition of RLi, wherein the butadiene is polymerized in a significant amount as 1,2 fashion and wherein the molar ratio between the initiator RLi and the living polymer ALi in step (b) is in the range from 0.45 to 2.20; and (c) coupling the mixture of living polymers A-B-Li and $B^1$Li obtained with a hexafunctional coupling agent.

The molar ratio between the initiator RLi and the living polymer ALi in step (b) is preferably either in the range of from 0.93 to 1.07 or in the range of from 1.90 to 2.10 or from 0.45 to 0.55 providing a final 6-armed block copolymer comprising either three AB blocks together with three $B^1$ blocks, or four AB blocks together with two $B^1$ blocks, or two AB blocks together with four $B^1$ blocks.

The hexafunctional coupling agent may be selected from bis(trichlorosilyl) alkane, wherein the alkane group having from 2–10 carbon atoms, or bis(trialkoxy silyl) alkanes, wherein the alkane is as defined hereinbefore and the alkoxy contains from 1–4 carbon atoms, or compounds of the general formula $(R_1—O)_3Si—R_2—O—R_2—Si(OR_1)_3$, wherein $R_1$ is an alkylene group of 1 to 4 carbon atoms and $R_2$ is an alkylene group of 2 to 10 carbon atoms. Preferred coupling agents are selected from 1,2 bis(trimethoxysilyl) ethane, 1,2 bis(trichlorosilyl)ethane and 3,3'-oxydipropylbis(trimethoxysilyl). The non halogen containing coupling agents of those specified are most preferred.

It will be appreciated that during the polymerization of butadiene in step (b), a modifier is present which causes increased vinyl contents (35–70%). Such vinyl contents in said specified range were found to increase the UV and/or the EB radiation sensitivity of the final composition.

Modifiers which can be used for this purpose can be selected from the group consisting of ethers, amines and other Lewis bases and more in particular from the group consisting of dialkyl ethers of glycols. Most preferred modifiers are selected from dialkyl ether of ethylene glycol, containing the same of different terminal alkoxy groups and optionally bearing an alkyl substituent on the middle ethylene radical, such as monoglyme, diglyme, diethoxy ethane, 1,2-diethoxypropane, 1-ethoxy, 2-tert.-butoxy ethane, of which 1,2 diethoxy propane is most preferred.

Suitable organolithium initiators which can be used include one or more compounds selected from the group consisting of ethyllithium, n-propyllithium, isopropyllithium, n-butyllithium, sec-butyllithium, tert.-octyllithium, n-decyllithium, n-eicosyllithium, phenyllithium, 2-naphthyllithium, 4-butylphenyllithium, cyclohexyllithium, 4-cyclopentylbutyllithium and the like. Sec-butyllithium and tert.-butyllithium are preferred.

The advantages which were surprisingly found to be obtained by application of the hereinbefore specified groups of block copolymers of the present invention are:

(a) very attractive low hot melt viscosity at usual processing temperatures of the block copolymer containing hot melt adhesive compositions;

(b) the simple structure of the block copolymers which can be manufactured with a coupling efficiency between 85% and 95% at a relatively low cost price;

(c) the UV radiation sensitivity which has been found to meet the most recent requirements, in combination with higher processing speed of the end use compositions and/or the need for less radiation energy per surface unit whereas the behavior of 4 armed and multiarmed prior block copolymers is much different;

(d) acceptable high temperature resistance can be obtained after curing of the adhesive composition comprising the block copolymer;

(e) no need of additional separate cross linking agents like acrylates which means significantly less danger for the environment and human health (toxicity of these additives); and (f) no need for the strict exclusion of air during UV irradiation.

It will be appreciated that other aspects of the present invention are radiation curable hot melt adhesive, sealant, and coating compositions. Hot melt adhesive compositions will comprise the hereinbefore specified UV and/or EB radiation sensitive block copolymers together with the usual ingredients such as tackifying resin, extender oil and/or plasticizer, petroleum derived waxes, antioxidant, photosensitizer (in case of UV irradiation curing), and optionally a resin which is compatible with the monovinyl aromatic block.

The block copolymer by itself is not sufficiently tacky or sticky. Therefore It is necessary to add a tackifying resin that is compatible with the elastomeric poly(butadiene) blocks. In the adhesive compositions according to the present invention, it has been found preferable that the tackifying resin should have a low level of unsaturation in order to achieve low radiation curing dosage of the adhesive composition. Mixtures of resins having higher and lower unsaturations and softening points may also be used but are less preferred due to possible uncontrollable side reactions. Examples of resins which are useful in the adhesive compositions of the present invention include saturated resins, esters of resins, polyterpenes, terpene phenol resins, and polymerized mixed olefins or mixtures thereof. The amount of tackifying resin or resins in total varies from 10 to 300 parts per hundred parts by weight of block copolymer (pbw), preferably from 50 to 200 pbw.

Examples of useful tackifying resins are ESCOREZ 5300 series (ESCOREZ is trademark); REGALITE R91, R101, S100, S260 (REGALITE is trademark); REGALREZ 1018, 3102, 6108, 5095 (REGALREZ is trademark); ZONATAC Lite series like the ZONATAC 105 LITE (ZONATAC is trademark); and the like.

Optionally, a modifying resin that is compatible with the poly(vinyl aromatic) blocks may be added as long as it does not appreciably hinder the radiation curing process as a result of mixing on a molecular level with the poly (butadiene) blocks. Compatibility is judged by the method disclosed in U.S. Pat. No. 3,917,607. Normally the resin should have a softening point above 100° C. as determined by ASTM method E28.

The adhesive, sealant, or coating compositions of the instant invention may also contain plasticizers such as rubber extending or compound oils in order to provide wetting action and/or viscosity control. These plasticizers are well-known in the art and may include both high paraffinic or naphthenic content oils and aromatic content oils. Said plasticizers include not only the usual plasticizers but also embrace the use of olefin oligomers and low molecular weight polymers as well as vegetable and animal oil and their derivatives. The petroleum derived oils which may be employed are relatively high boiling materials and preferably contain only a minor proportion of aromatic hydrocarbons (preferably less than 30 percent and, more preferably, less than 15 percent by weight of the oil).

Such oils are for example SHELLFLEX 451, 4510 (SHELLFLEX is trademark); ONDINA 68 (ONDINA is trademark); RISELLA 68 (RISELLA is trademark); PRIMOL 352 (PRIMOL is trademark); WITCO 260 (WITCO is trademark); and the like, of which ONDINA, RISELA and PRIMOL oils are known as totally non-aromatic oils. The oligomers may be polypropylene, polybutene, hydrogenated polyisoprene, hydrogenated polybutadiene, or the like having average weights preferably between 200 and about 10,000. Vegetable and animal oils include glyceryl esters of usual fatty acids andpolymerization products thereof may also be used. The amount of plasticizer and oil employed varies from 0 to 500 pbw (parts by weight per hundred parts by weight of block copolymer), preferably from 0 to 150 pbw and more preferably from 5 to 120 pbw.

Various petroleum derives waxes may also be present in the composition in order to impart fluidity in the molten condition of the adhesive and flexibility to the set adhesive, and to serve as a wetting agent for bonding cellulosic fibres. The term "petroleum derived wax" includes both paraffin and microcrystalline waxes having a melting point within the range of about 54° C. to about 107° C. as well as synthetic waxes such as low molecular weight polyethylene or Fisher-Tropsch waxes. The amount of petroleum derived waxes employed herein varies from 0 to about 100 pbw, preferably from 0 to about 15 pbw.

It will be appreciated that the best are achieved when, like the tackifying resins, the plasticizers and oils contain low levels of unsaturation. Additionally, it is also preferably to minimise the aromatic content thereof.

The adhesive, sealant or coating compositions may further contain conventional additives such as e.g. stabilizers, pigments, fillers and the like but the compositions should be free of other additives and impurities which adversely affect the adhesive sealant or coating properties of the composition, and particularly the high temperature properties thereof.

Stabilizers and oxidation inhibitors are typically added to the commercially available compounds in order to protect the ingredients against degradation during preparation and use of the adhesive compositions, however without interfering with the irradiation curing of the polymer. Combinations of stabilizers are often more effective due to the different mechanisms of degradation to which various polymers are subject. Certain hindered phenols, organo-metallic compounds, aromatic amines, aromatic phosphites, and sulphur compounds are useful for this purpose. Examples of effective types of these materials include phenolic antioxidants, thio compounds, and tris-(nonylated phenyl) phosphates.

Examples of commercially available antioxidants are "IRGANOX 565" 2,4-bis-(n-octylthio)-6-(4-hydroxy-3,5-di-tertiary-butyl anilino)-1,3,5-triazine, "IONOL" 2,6-di-tertiary-butyl-4-methyl phenol, "IRGANOX 1010" tetrakis-ethylene-(3,5-di-tertiary-butyl-4-hydroxy-hydrocinnamate) methane, "IONOX 330" 3,4,6-tris (3,5-di-tertiary-butyl-p-hydroxybenzyl)-1,3,5-trimethylbenzene, and "POLYGARD HR" tris-(2,4-di-tertiary-butyl-phenyl) phosphite. In general from about 0.01 percent to about 5.0 percent by weight of one or more antioxidants is included in the adhesive, sealant, or coating compositions.

The adhesive, sealant, or coating compositions of the present invention may be prepared by blending block copolymers, tackifying resins, and other desired ingredients at an elevated temperature, e.g. at about 160° C. (hot-melt) using a Z blade mixer or extruder or any other usual type of mixer for that purpose.

Adhesives of the present invention are especially suited for preparation as 100% solids hot-melt adhesives since they give relatively low processing viscosities, less than hundred thousand centipoise, and adequate pot life, up to several hours, at processing temperatures of from 150° C. to 180° C. A preferred method for processing is the use of an extruder to mix the adhesive and feed the coating die as is disclosed in U.S. Pat. No. 3,984,509 which is herein incorporated by reference.

The compositions of the present invention may be cured by exposure to high energy ionizing radiation such as electron beam radiation or by UV radiation. The electron beam radiation or high energy ionizing radiation which employed to effect the cross-linking reaction can be obtained from any suitable source such as an atomic pile, an electron gun, a resonant transformer accelerator, a Van de Graaf electron accelerator, a Lineac electron accelerator, a betatron, a synchrotron, a cyclotron, or the like. Radiation from these sources will produce ionizing radiation such as electrons, protons, neutrons, deuterons, gamma rays, X rays, alpha particles, and beta particles.

The cross-linking reaction is conveniently effected at room temperature, but it can be conducted at depressed or elevated temperatures if desired. It is also within the spirit and scope of the invention to effect the cross-linking reaction within the confines of an inert atmosphere to prevent interference in the block copolymer cross-linking, particularly at an exposed surface.

Additionally, cross-linking may be effected when irradiating the composition which is sandwiched between substrates such as when the composition is utilised as a tie-layer between these substrates. Similarly, when the cross-linking reaction is not conducted within the confines of an inert atmosphere, release paper may be placed over the exposed composition surface contacting and covering the same. Thus, the composition may be cross-linked by irradiation through the release paper or the substrate.

The amount of irradiation required to produce a satisfactory cure depends primarily upon the type and concentration of the block copolymer employed and the unsaturation level present in the composition. Suitable dosages of electron beam irradiation are in the range from 0.5 to 8 Mrad, preferably about 4 Mrad to about 8 Mrad, and more preferably about 6 Mrad to about 8 Mrad.

The adhesive compositions may also be cured by exposure to ultraviolet radiation for a period of time sufficient to effect the desired amount of cross-linking. Ordinarily, when use of ultraviolet light is contemplated, the adhesive composition will be formulated with from 0.2 to 30% parts by weight of an ultraviolet sensitising component (photoinitiator) per 100 parts by the weight of the block copolymer. Any of the known ultraviolet sensitising compounds may be used. A preferred group of photoinitiators is selected from the group consisting of:

(1) at least one benzophenone of the general formula (I)

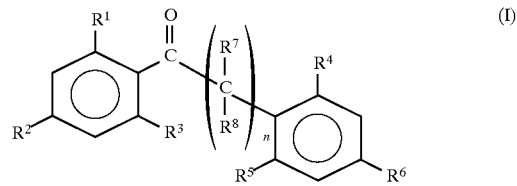

wherein $R^1$ to $R^8$ independently represent hydrogen or an alkyl group having from 1 to 4 carbon atoms, preferably methyl, and wherein $R^7$ and/or $R^8$ represent in addition alkoxy of 1 to 4 carbon atoms and wherein n has a value of 0, 1 or 2, optionally in combination with at least one tertiary amine, (2) at least one sulphur-containing carbonyl compound, wherein the carbonyl group is directly bound to at least one aromatic ring, preferably of the general formula

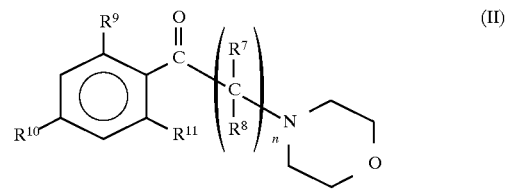

wherein $R^9$, $R^{10}$, $R^{11}$ each may represent hydrogen, alkyl of 1–4 carbon atoms or an alkylthio group, having 1 to 4 carbon atoms, and (3) mixtures of (1) and (2).

Examples of suitable compounds of category (1) are benzo-phenone, 2,4,6-trimethylbenzophenone, 4-methylbenzophenone and an eutactic mixture of 2,4,6-trimethylbenzophenone and 4-methylbenzo-phenone (ESACURE TZT) and 2,2-dimethoxy-1,2-diphenylethan-1-one (IRGACURE 651) (ESACURE and IRGACURE are trademarks). These compounds may be employed in combination with tertiary amines, such as e.g. UVECRYL 7100 (UVECRYL is trademark). Category (2) embraces compounds such as e.g. 2-methyl-1-[4-(methylthio)phenyl]-2-morpholinopropanone-1, commercially available as IRGACURE 907 (IRGACURE is trademark).

An example of suitable mixtures (category (3)) is a mixture of 15% by weight of a mixture of 2-isopropylthioxanthone and 4-isopropylthioxanthone and 4-isopropylthioxanthone, and 85% by weight of a mixture of 2,4,6-trimethylbenzophenone and 4-methyl-benzophenone. This mixture is commercially available under the tradename name ESACURE X15.

Photoinitiators of any one of the above categories (1), (2) and (3) may also be used in combination with other photoinitiators, such as e.g. UVECRYL P115. Particularly useful is a combination of benzophenoen and said UVECRYL P115.

In a preferred embodiment of the present invention, the photoinitiator is selected from the group consisting of (i) benzophenone, (ii) a mixture of benzophenone and a tertiary amine containing a carbonyl group which is directly bonded to at least one aromatic ring, (iii) 2-methyl-1-[4-(methylthio) phenyl]-2-morpholinopropanone-1 (IRGACURE 907) (iv) 2,2-dimethoxy-1,2-diphenylethan-1-one (IRGACURE 651) of which (iii) and (iv) are most preferred.

It will be appreciated that the length of the exposure required is dependent on the intensity of the radiation, the amount and particular type of the ultraviolet sensitising compound employed, the thickness of the adhesive layer, etc. The photo-initiators may preferably be included in an amount in the range of from 1 to 10 parts by weight per 100 parts by weight of block copolymer, and more preferably in an amount in the range of from 1 to 5 parts by weight.

The UV irradiation used for cross-linking the block copolymer composition of the present invention in principle may come from any UV source having an output spectra showing one or more peaks at wavelengths between 200 and 500 nanometer (nm). Particularly suitable UV sources are Fusion bulb lamps (Fusion bulb lamps may also be used). H and D bulb lamps (linear power 300 W/inch and 600 W/inch) are particularly useful, while a combination of D bulb and H bulb can also be suitably applied.

The exposure to UV irradiation may be performed by any known method. A suitable method is exposing a sample either in a layer obtained from a hot melt or in a layer obtained by solvent coating to UV irradiation by passing said sample at a certain speed (expressed in meters per minute, m/min) underneath the UV source. If necessary, the exposure to irradiation may be repeated one or more times, e.g. by repeatedly passing the sample underneath the UV source or by passing the sample underneath two or more lamps positioned in series, in order to accomplish sufficient curing. The lower the total irradiation dose and the higher the speed with which the sample can be passed underneath the UV source for obtaining sufficient and satisfactory curing, the better the curing ability of the said sample.

Preferred uses of the present formulation are in the preparation of pressure-sensitive adhesive (PSA) tapes and in the manufacture of labels. The pressure-sensitive adhesive tape comprises a flexible backing sheet and a layer of the adhesive composition of the instant invention coated on one major surface of the backing sheet. The backing sheet may be a plastic film, paper, or any other suitable material and the tape may include various other layers or coatings, such as primers, release coatings, and the like, which are used in the manufacture of pressure-sensitive adhesive tapes.

The invention is further illustrated by means of the following examples, however, without restricting the scope of the invention to these preferred embodiments.

EXAMPLE 1

Preparation of polymer P1

250 g of styrene were added to 18 liters of cyclohexane at 50° C., after the addition of 20 mmol sec-butyl lithium. The reaction was completed after 40 minutes. Hereafter, 8 ml of 1,2-diethoxypropane (DEP) were added. The temperature of the reactor was raised to 60° C., followed by the addition of 20 mmol of sec-butyl lithium. Then 1414 g of butadiene were dosed gradually to the reaction mixture in 15 minutes. The polymerization was allowed to proceed at 60° C. for 120 minutes. Then 1.96 ml bis(trimethoxysilyl)ethane (BTMSE) were added to couple the living chains. After the reaction mixture was cooled down to 20° C. after 12 hours, 20 ml of ethanol were added.

The polymer was stabilized with 0.2 pbw IONOL and 0.4 pbw polygard and isolated by steam stripping to give white crumbs. The product P1 was analysed by ASTM D3536. The vinyl content is measured by infrared spectroscopy described generically in ASTM D 3677.

EXAMPLE 2

Preparation of polymer P2

225 g of styrene were added to 18 liters of cyclohexane at 50° C., after the addition of 21 mmol sec-butyl lithium. The reaction was completed after 40 minutes. Thereafter, 14 ml of 1,2-diethoxypropane (DEP) were added. The temperature of the reactor was raised to 70° C., followed by the addition of 21 mmol of sec-butyl lithium. Then 1275 g of butadiene were dosed gradually to the reaction mixture in 20 minutes. The polymerization was allowed to proceed at 70° C. for 60 minutes. Then 2.12 ml bis(trimethoxysilyl)ethane (BTMSE) were added to couple the 'living' chains. After the reaction mixture was cooled down to 20° C. after 12 hours, 20 ml of ethanol were added. The polymer was stabilized with 0.2 pbw IONOL and 0.4 pbw POLYGARD and isolated by steam stripped to give white crumbs. The product P2 was analysed by ASTM D3536. The vinyl content was measured by infrared spectroscopy described generically in ASTM D 3677.

EXAMPLE 3

Preparation polymer P3

225 g of styrene were added to 18 liters of cyclohexane at 50° C., after the addition of 21.5 mmol sec-butyl lithium. The reaction was completed after 40 minutes. Hereafter, 13 ml of 1,2-diethoxy-propane (DEP) were added. The temperature of the reactor was raised to 70° C. Then 294 g of butadiene were dosed gradually to the reaction mixture in 6 minutes. The polymerization was allowed to proceed at 70° C. for 30 minutes. Hereafter 21.5 mmol sec-butyl lithium and 1 ml DEP were added, immediately followed by adding 981 g of butadiene gradually in 13 minutes. The polymerization was allowed to proceed at 70° C. for 60 minutes. Then 2.19 ml bis(tri-methoxysilyl)ethane (BTMSE) were added to couple the living chains. After the reaction mixture was cooled down to 20° C. after 12 hours, 20 ml of ethanol were added.

The polymer was stabilized with 0.2 pbw IONOL and 0.4 pbw POLYGARD and isolated by steam stripping to give white crumbs. The product P3 was analysed by ASTM D3536. The vinyl content was measured by infrared spectroscopy described generically in ASTM D 3677.

EXAMPLE 4

Preparation comparative polymer P4

225 g of styrene were added to 18 liters of cyclohexane at 50° C., after addition of 21 mmol sec-butyl lithium. The reaction was completed after 40 minutes. The temperature of the reactor was raised to 70° C., followed by the addition of 21 mmol of sec-butyl lithium. Then 1275 g of butadiene was does gradually to the reaction mixture in 20 minutes. The polymerization was allowed to proceed at 70° C. for 60 minutes. Then 2.12 ml bis(trimethoxysilyl)-ethane (BTMSE) was added to couple the 'living' chains. After the reaction mixture was cooled down to 20° C. after 12 hours, 20 ml of ethanol were added. The polymer was stabilized with 0.2 pbw IONOL and 0.4 pbw POLYGARD and isolated by steam stripping to give white crumbs. The product P4 was analysed by ASTM D3536. The vinyl content was measured by infrared spectroscopy described generically in ASTM D 3677.

EXAMPLE 5
Preparation of Comparative 4-armed polymer
250 g of styrene were added to 18 liters of cyclohexane at 50° C., after the addition of 23 mmol sec-butyl lithium. The reaction was completed after 40 minutes. Hereafter, 4.3 ml of 1,2-diethoxy-propane (DEP) were added. The temperature of the reactor was kept at 50° C., followed by the addition of 23 mmol of sec-butyl lithium. Then 1750 g of butadiene were dosed gradually to the reaction mixture in 40 minutes. The polymerization was allowed to proceed at 50° C. for 100 minutes. Then 3.00 ml 3-glycidoxypropyltrimethoxysilane (GPTS) were added to couple the 'living' chains. After the reaction mixture was cooled down to 20° C. after 12 hours, 20 ml of ethanol were added.

The polymer was stabilized with 0.2 pbw IONOL and 0.4 pbw POLYGARD and isolated by steam stripping to give white crumbs. The product P5 was analysed by ASTM D3536. The vinyl content was measured by infrared spectroscopy described generically in ASTM D 3677.

EXAMPLE 6
200 g of styrene were added to 18 liters of cyclohexane at 50° C., after the addition of 18 mmol sec-butyl lithium. The reaction was completed after 40 minutes. Hereafter, 4.3 ml of 1,2-diethoxy-propane (DEP) were added. The temperature of the reactor was kept at 50° C., followed by the addition of 18 mmol of sec-butyl lithium. Then 1800 g of butadiene were dosed gradually to the reaction mixture in 40 minutes. The polymerization was allowed to proceed at 50° C. for 100 minutes. Then 2.41 ml 3-glycidoxypropyltrimethoxy-silane (GPTS) were added to couple the 'living' chains. After the reaction mixture was cooled down to 20° C. after 12 hours, 20 ml of ethanol were added.

The polymer was stabilized with 0.2 pbw IONOL 0.4 pbw POLYGARD and isolated by steam stripping to give white crumbs. The product P6 was analysed by ASTM D3536. The vinyl content was measured by infrared spectroscopy described generically in ASTM D 3677.

EXAMPLE 7
Preparation of a 6-armed polymer P7
200 g of styrene were added to 18 liters of cyclohexane at 50° C., after the addition of 19 mmol sec-butyl lithium. The reaction was completed after 40 minutes. Hereafter, 4.5 ml of 1,2-diethoxy-propane (DEP) were added. The temperature of the reactor was kept at 50° C., followed by the addition of 36 mmol of sec-butyl lithium. Then 1800 g of butadiene were dosed gradually to the reaction mixture in 40 minutes. The polymerization was allowed to proceed at 50° C. for 100 minutes. Then 2.96 ml bis(trimethoxysilyl)ethane (BTMSE) were added to couple the 'living' chains. After the reaction mixture was cooled down to 20° C. after 12 hours, 20 ml of ethanol were added.

The polymer was stabilized with 0.2 pbw IONOL and 0.4 pbw POLYGARD and isolated by steam stripping to give white crumbs. The product P7 was analysed by ASTM D 3536. The vinyl content was measured by infrared spectroscopy described generically in ASTM D 3677.

EXAMPLE 8
Preparation of a 6 armed polymer P8
200 g of styrene were added to 18 liters of cyclohexane at 50° C., after the addition of 22 mmol sec-butyl lithium. The reaction was completed after 40 minutes. Hereafter, 4.7 ml of 1,2-diethoxy-propane (DEP) were added. The temperature of the reactor was kept at 30° C., followed by the addition of 44 mmol of sec-butyl lithium. Then 1800 g of butadiene were dosed gradually to the reaction mixture in 40 minutes. The polymerization was allowed to proceed at 50° C. for 100 minutes. Then 2.3 ml (bis(trichlorosilyl)ethane (BTCSE) were added to couple the 'living' chains. After the reaction mixture was cooled down to 20° C. after 12 hours, 20 ml of ethanol were added.

The polymer was stabilized with 0.2 pbw IONOL and 0.4 pbw POLYGARD and isolated by steam stripping to give white crumbs. The product P8 was analysed by ASTM D 3536. The vinyl content was measured by infrared spectroscopy described generically in ASTM D 3677.

| Polymer | MW (SB-Li)[1] (kg/mol) | MW (B-Li)[2] (kg/mol) | | MW (SB)x[3] (kg/mol) (%) | | | CE[4] (%) | Vinyl[5] (%) |
|---|---|---|---|---|---|---|---|---|
| P1 | 85.6 | 70.6 | | 280 | (88) | | 78 | 61 |
| P2 | 75.2 | 73.0(*) | | 254 | (49) | | 80 | 62 |
| P3 | 80.5 | 45.3 | | 255 | (42) | | 79 | 63 |
| P4 | 72.7 | 61.2 | | 274 | (89) | | 86 | 8 |
| P5 | 78.8 | 74.4(*) | 217 | (28) | 266 | (38) | 87 | 60 |
| P6 | 104.9 | 97.2(*) | 282 | (36) | 354 | (34) | 86 | 59 |
| P7 | 62.3 | 52.7 | | 227 | (94) | | 83 | 56 |
| P8 | 58.9 | 50.4 | | 247 | (88) | | 91 | 57 |

[1]Apparent molecular weight by ASTM D 3536 as detected by UV absorption.
[2]Apparent molecular weight by ASTM D 3536 as detected by refractive index.
[3]Apparent molecular weight by ASTM D 3536 as detected by UV absorption of the product formed after coupling. The main peaks are listed. Between brackets is the percentage of the peak with respect to the total amount of coupled product (i.e. product with a higher molecular weight than S-B).
[4]Coupling efficiency as determined from the GPC diagram obtained by ASTM D 3536 as detected by UV absorption. The percentage of coupled product (i.e. product with a higher molecular weight than S-B) formed with respect to the total amount of SB present prior to coupling.
[5]As determined infrared spectroscopy described generically in ASTM D 3677.
(*)Peaks SB-Li and B-Li not well separated; consequently the average molecular weight is listed.

The multiblock copolymers identified as P7 and P8 having an average adjusted structure $(AB)_2(B^1)_4X$, wherein X is the residue of bis(trimethoxysilyl)ethane and bis(trichlorosilyl)-ethane respectively, were included in a hot melt adhesive composition comprising 100 parts by weight of the respective block copolymer, 210 parts by weight of tackifying resins REGALITE R 91 and REGALREZ 1018, and 3 parts by weight of stabilizer IRGANOX 1010.

The properties of these hot melt adhesive compositions were compared with those compositions having the same ingredients except that the 6-armed block copolymers P7 and P8 were replaced on the one hand by several four armed block copolymers containing similar arm segments AB and $B^1$ (P7, P8 and P9 and P10) and, on the other hand, by a commercially available multiarmed star block copolymer having 18 arms comprising similar AB and $B^1$ arms and wherein X is the residue of divinylbenzene prepolymer.

The four-armed block copolymers P9 and P10 consisted of block copolymers prepared according to the methods of the Examples I–IX in WO 93/24547 and the star shaped block copolymer P11 was a block copolymer prepared according to the methods of the Examples X to XII of WO 93/24547. The hot melt viscosity and the respective ingredients of the adhesive compositions have been listed in Table I.

The SAFT results and loop tack results after irradiation of P5, P6, P9, P10 and P11 and P7 and P8 are compared in Tables II and III.

TABLE I

Comparison 4/6/18 arms ARP's polymers for radiation curing

|  | 4 arms | | | | 6 arms | | | | | star shaped (18 arms) | |
|---|---|---|---|---|---|---|---|---|---|---|---|
|  | P9 | P10 | P5 | P6 | P1 | P2 | P3 | P7 | P8 | P11 | D1320X |
| C.A | SiCl$_4$ | SiCl$_4$ | GPTS | GPTS | BTMSE | BTMSE | BTMSE | BTMSE | BTMCSE | DVB | DVB |
| mid-block | B | B | B | B | B | B | B | B | B | B | 1 |
| vinyl % | 54 | 56 | 60 | 59 | 61 | 62 | 63 | 56 | 57 | 63 | 8 |
| Formulation for adhesive tests (same Tg and polymer content)* | | | | | | | | | | | |
| Regalite R91 | 147 | 129 | — | — | 122 | 120 | 121 | 93 | 93 | 121 | 150 |
| Regalrez 1018 | 63 | 81 | — | — | 88 | 90 | 89 | 117 | 117 | 89 | 60 |
| Irgacure 651 | 3 | 3 | — | — | 3 | 3 | 3 | 3 | 3 | 3 | 3 |
| Irganox 1010 | 2 | 2 | — | — | 2 | 2 | 2 | 2 | 2 | 2 | 2 |
| HMV 160° C. | 14 | 47 | 29 | 53 | 12.3 | 11.0 | 22.5 | 6.7 | 10.4 | >2000 | 49 |
| HMV after 8 h at 160° C. | 15 | 63 | 38 | 61 | 15.1 | 13.1 | 25.0 | 7.4 | 11 | >2000 | 58 |

HMV: Brookfield Hot melt Viscometer (Pa.s)
The formulation used for the Hot Melt Viscosity is the same for all samples: polymer/Regalite R91/Regalrez 1018/Irganox 1010 = 100/150/60/3
P7 and P8 exhibit very low HMV, which could be very interesting for the industry. The star shaped molecule (coupled with DVB) contained a vinyl modified midblock is not processable in hot melt.
Remark: P5 and P6 have not been irradiated with 240 W/cm lamps. However, when irradiated with 120 W/cm lamps, the loop tack could not be measured any more (24 N/25 mm before curing, 0 N/25 mm after curing).

TABLE II

SAFT results (SS/500 g/°C.) after irradiation in one pass under a combination of 240 W/cm D + H bulbs (irradiated in presence of air)

| | | | | | | D 1320X | |
|---|---|---|---|---|---|---|---|
| speed/m/min | P9 | P10 | P7 | P8 | P11 | no air | in air |
| no cured | 75 | 80 | 60 | 58 | | 85 | 84 |
| 20 | >160 | >160 | >160 | >160 | >160 | 161 | 102* |
| 30 | 150 | >160 | >160 | >160 | | 155 | 111* |
| 40 | 111 | 147 | >160 | >160 | | 108 | 107* |
| 50 | 82 | >160 | 115 | >160 | | 100 | 108* |
| 60 | 80 | >160 | 69 | 86 | | 91 | 103* | nm: not measured
*adhesive failure

Temperature resistance of P7 and P8 is very good up to 40 or 50 m/min curing speed.
KRATON D-1320X based formulation has been irradiated in presence of air and through the polyester (no air). Both results are reported here. As we can see, KRATON D-1320X evaluated with the same photoinitiator as the experimental polymers is much more affected by the inhibiting effect of oxygen.

TABLE III

Loop Tack (N/25 mm) after irradiation in one pass under a combination of 240 W/cm D + H bulbs

| | | | | | | KRATON D-1320X | |
|---|---|---|---|---|---|---|---|
| speed/m/min | P9 | P10 | P7 | P8 | P11 | no air | in air |
| no cured | 34/15 | 25 | 22 | 17 | | 21 | 27 |
| 20 | 1/0 | 2/0 | 20 | 10 | | 18 | 22 |
| 30 | 3/1 | 10/3 | nm | nm | | 24 | 24 |
| 40 | 16/4 | 13/5 | nm | nm | | 24 | 24 |
| 50 | 18/4 | 19/8 | nm | nm | | nm | nm |
| 60 | nm | nm | 16 | 13 | | nm | nm | nm: not measured
Two values are mentioned for the zippery tack: the maximum and minimum loads (max/min)
P9 and P10 based adhesives present zippery loop tack after curing, especially at the high radiation doses. The tack is nearly completely lost (1 N/25 mm). The Loop tack for P7 is acceptable. A decrease of loop tack is observed for P8 based on adhesive but the samples did not show any zippery tack.
KRATON D-1320X keeps its tack unchanged, even at high doses (20 m/min).

TABLE IV

Loop Tack (N/25 mm) after irradiation in one pass under a combination of 120 W/cm D + H bulbs

| speed m/min | P1 | P2 | P3 |
|---|---|---|---|
| not irradiated | 20 | 20 | 4/13 |
| 10 | 13 | 11 | 0.3 |

TABLE IV-continued

Loop Tack (N/25 mm) after irradiation in one pass under a combination of 120 W/cm D + H bulbs

| speed m/min | P1 | P2 | P3 |
|---|---|---|---|
| 15 | 14 | 13 | — |
| 20 | 16 | 15 | 0.7 |
| 25 | 15 | 15 | 2/5 |

TABLE V

SAFT (SS/500 g/°C.) results after irradiation in one pass under a combination of 120 W/cm D + H bulbs

| speed m/min | P1 | P2 | P3 | P11 |
|---|---|---|---|---|
| not irradiated | — | — | — | — |
| 10 | >160 | >160 | 128 | >160 |
| 15 | >160 | >160 | 82 | >160 |
| 20 | 96 | 84 | 75 | >160 |

We claim:

1. Radiation sensitive block copolymers to be used in hot melt adhesive composition, said copolymers having the general formula $(AB)_p(B^1)_qX$, wherein A is poly(vinylaromatic) block and B and $B^1$ are poly(butadiene) blocks, wherein X is the residue of a hexavalent coupling agent, wherein p and q have the number average values from 1.8 to 2.2 and from 3.8 and 4.2 respectively, whereas the sum of p and q values being 6, and the block copolymer has an average bound vinyl aromatic content in the range of from 10 to 50 wt %, a total apparent molecular weight in the range of from 100,000 to 500,000, and a vinyl content in the poly(butadiene) blocks in the range of from 35 to 70 wt %.

2. Radiation sensitive block copolymers according to claim 1, wherein the B blocks have an apparent molecular weight in the range of from 25,000 to 100,000.

3. Radiation sensitive block copolymers according to claim 1, wherein the A blocks have an apparent molecular weight in the range from 7,000 to 20,000.

4. Radiation sensitive block copolymers according to claim 1, wherein the total apparent molecular weight is in the range of from 200,000 to 350,000.

5. Radiation sensitive block copolymers according to claim 1 wherein the vinyl content in the poly(butadiene) blocks is in the range of from 45 to 70%.

6. Radiation sensitive block copolymers according to claim 1 wherein X represents the residue of bis(trichlorosilyl)ethane or bis(trimethoxysilyl)ethane.

7. Radiation curable adhesive, sealant, and coating compositions comprising one or more of the block copolymers of claim 1.

8. Pressure sensitive radiation curable tapes and labels comprising a flexible backing sheet and a layer of the adhesive composition of claim 7 coated on one major surface of the backing sheet.

9. A process for the preparation of the radiation sensitive block copolymers of claim 1 comprising:

(a) polymerizing a monovinyl aromatic monomer in the presence of an organolithium initiator RLi having from 4 to 6 carbon atoms, to form a living polymer ALi;

(b) polymerizing butadiene to the living polymer ALi and onto the organolithium initiator RLi giving a mixture of living polymers A—B—Li and $B^1$Li wherein the segments B and $B^1$ may have the same or different molecular weights; wherein the butadiene is polymerized in a significant amount as 1,2 addition and wherein the molar ratio between the initiator RLi and the living polymer ALi in step (b) is in the range from 0.45 to 2.20; and (c) coupling the mixture of living polymers A—B—Li and $B^1$Li with a hexafunctional coupling agent.

10. The process according to claim 9, wherein the same amount of organolithium initiator is used for the polymerization of styrene and for the polymerization of butadiene.

11. The process according to claim 9, wherein the coupling agent is $Cl_3Si$—$CH_2$—$CH_2$—$SiCl_3$ or $(MeO)_3Si$—$CH_2$—$CH_2$—$Si(OMe)_3$.

12. The process according to claim 9, wherein 1,2-diethoxypropane is used as the vinyl content modifier.

* * * * *